United States Patent [19]
Ishikawa et al.

[11] Patent Number: 5,902,529
[45] Date of Patent: May 11, 1999

[54] PROCESS FOR PRODUCING THERMOPLASTIC RESIN FOAMS

[75] Inventors: Mikio Ishikawa, Tochigi; Teruyoshi Akuzawa, Nara, both of Japan

[73] Assignee: Sekisui Kaseihin Kogyo Kabushiki Kaisha, Nara, Japan

[21] Appl. No.: 08/951,586

[22] Filed: Oct. 16, 1997

Related U.S. Application Data

[63] Continuation of application No. 08/508,564, Jul. 28, 1995, abandoned.

[30] Foreign Application Priority Data

Jul. 29, 1994 [JP] Japan ................................ 6-197933

[51] Int. Cl.⁶ ............................ B29C 44/20; B29C 47/64
[52] U.S. Cl. ............................ 264/51; 264/50; 425/199; 425/208
[58] Field of Search ................................ 425/197, 199, 425/208, 817 C; 264/50, 51, 53, 54

[56] References Cited

U.S. PATENT DOCUMENTS

| | | | |
|---|---|---|---|
| 2,835,927 | 5/1958 | Henning | 264/45.9 |
| 3,599,292 | 8/1971 | Camerlata | 425/197 |
| 3,713,762 | 1/1973 | Oisugu | 425/197 |
| 3,792,839 | 2/1974 | Gidge | 264/53 |
| 3,856,442 | 12/1974 | Gallagher et al. | 264/51 |
| 3,920,876 | 11/1975 | Albert et al. | 264/45.9 |
| 3,954,365 | 5/1976 | Barth et al. | 425/197 |
| 3,981,649 | 9/1976 | Shimano et al. | 425/208 |
| 4,017,225 | 4/1977 | Hanning | 425/4 R |
| 4,057,379 | 11/1977 | Sato | 425/199 |
| 4,087,222 | 5/1978 | Noel | 264/45.9 |
| 4,107,247 | 8/1978 | Dukess | 264/45.9 |
| 4,206,165 | 6/1980 | Dukess | 264/45.9 |
| 4,401,612 | 8/1983 | Nehmey et al. | 425/208 |
| 4,454,087 | 6/1984 | Hayashi et al. | 425/817 C |
| 4,615,664 | 10/1986 | Kolossow | 425/199 |
| 4,994,223 | 2/1991 | Hestehave et al. | 264/349 |
| 5,055,027 | 10/1991 | Sato | 425/208 |
| 5,124,095 | 6/1992 | Gianni et al. | 264/45.5 |
| 5,413,475 | 5/1995 | Murata et al. | 425/208 |

FOREIGN PATENT DOCUMENTS

54-42026  12/1979  Japan .

*Primary Examiner*—Allan R. Kuhns
*Attorney, Agent, or Firm*—Armstrong, Westerman, Hattori, McLeland & Naughton

[57] ABSTRACT

An improved process and apparatus for producing a thermoplastic resin foam by mixing a thermoplastic resin, a blowing agent and other necessary components in a molten state and extruding the mixture to expand. The apparatus comprises a metering zone provided at the front end of the rotating shaft in an extruder, a kneading zone provided closer to the rear end than the metering zone, and a plurality of perforated plates mounted on the surface of the shaft in the kneading zone. The outside diameter of said shaft is made smaller than that of the screw in the metering zone as measured at the bottom of channels. This feature combines with the perforated plates to insure uniform mixing and consistent extruding operations.

14 Claims, 4 Drawing Sheets

PROCESS FOR PRODUCING THERMOPLASTIC RESIN FOAMS

This application is a continuation of application Ser. No. 08/508,564, filed Jul. 28, 1995, now abandoned.

FIELD OF THE INVENTION

This invention relates to a process for producing a thermoplastic resin foams which comprise adding a blowing agent to a thermoplastic resin, mixing the two components and extrusion foaming the mixture. The invention also relates to an apparatus for implementing the process. In particular, the invention relates to a process capable of producing thermoplastic resin foams consistently by this method, as well as an apparatus for implementing the process.

BACKGROUND OF THE INVENTION

Process for producing thermoplastic resin foams by adding a blowing agent and other necessary additives to a thermoplastic resin, mixing the respective components and extrusion foaming the mixture, as well as apparatus for implementing the processes are widely known. Among those processes, the approach of using an extruder having a rotating screw in a barrel finds extensive commercial use because of its capability for continuous production of desired foams in large volumes. This approach typically comprises the following steps: heating a thermoplastic resin to melt in an extruder with a blowing agent and other necessary additives are forced into the melt; mixing the respective components uniformly under pressure; cooling the mixture to a temperature suitable for expansion; extruding the cooled mixture through a specified die; and allowing the molded part to expand in the reduced atmosphere thereby producing desired foams in a continuous manner.

For uniform expansion, it is important that the blowing agent be uniformly mixed with the thermoplastic resin and that the molten resin be uniformly cooled to the temperature suitable for expansion. To meet these needs, various methods and apparatus have been proposed that are capable of both uniform mixing of the resin feed with the blowing agent and uniform cooling of the molten resin composition. One of these proposals is described in JP-B-54-42026 (the term "JP-B" as used herein means an "examined Japanese patent publication") and it uses a cooler that has a rotating shaft in a barrel that can be cooled; the shaft has a plurality of vanes or blades in a plate form that are provided on the circumference in a staggered pattern in both an axial and a circumferential direction, with the length of each vane being parallel to the axis of the shaft. Each vane has a plurality of holes that extend through the plate thickness. The through-holes in adjacent vanes are oriented in two different directions, one being from the inner to the outer circumference and the other being vice versa. According to JP-B-54-42026, this arrangement enables the molten foamable resin to be mixed and cooled uniformly. However, the cooler under consideration has no ability to thrust the resin and in order to prevent the loss of extrusion force, the diameter of the rotating shaft has to be increased to such an extent that the resulting equipment is difficult to install adjacent the extruder and adjust for proper operation.

Another proposal is made in JP-B-60-52926 (corresponding to U.S. Pat. No. 4,454,087) and it consists of providing a cooler of the above-described type and a zigzag mixer which is a kind of static mixers. A problem with this proposal is that a loss in the extrusion force occurs in the zigzag mixer and in order to compensate for the resulting loss in extrusion output, a sufficient thrust force must be secured by installing two extruders behind the cooler but then the overall production equipment becomes complex.

SUMMARY OF THE INVENTION

An object of the present invention is to provide a process for the production of a thermoplastic resin foam that uses a simple apparatus and which yet is capable of satisfactory extrusion molding of a thermoplastic resin after addition and mixing of a blowing agent, as well as the apparatus used to implement the process.

Another object of the invention is to provide a process for the production of a thermoplastic resin foam that is capable of extrusion molding of a thermoplastic resin after a blowing agent is added to and uniformly mixed with a thermoplastic resin, as well as an apparatus used to implement the process.

A further object of the invention is to provide a process for the production of a thermoplastic resin foam that is capable of extrusion molding of a thermoplastic resin after a blowing agent is added to and uniformly mixed with a thermoplastic resin, with the mixture being subsequently cooled uniformly, as well as an apparatus used to implement the process.

Yet another object of the invention is to provide a process for the production of a thermoplastic resin foam that enables a blowing agent to be added to and uniformly mixed with a thermoplastic resin while the mixture is uniformly cooled, whereby the cooled mixture can be extruded and expanded to a desired shape in a consistent manner, as well as an apparatus used to implement the process.

Still another object of the invention is to provide a process for the production of a thermoplastic resin foam that enables a blowing agent to be added to and uniformly mixed with a thermoplastic resin while the mixture is uniformly cooled, whereby the cooled mixture can be extruded to a desired shape in a consistent manner and in large quantities, as well as an apparatus used to implement the process.

In essence, the present invention relates to a process for the production of a thermoplastic resin foam by adding a blowing agent to a thermoplastic resin and mixing them in an extruder, characterized in that the thermoplastic resin is rendered in a molten state by means of the extruder and allowed to travel through a barrel as it passes between the inner surface of the barrel and the outer surface of a rotating shaft which has a plurality of perforated plates provided on the circumference such that the thermoplastic resin is mixed with the blowing agent under agitation, the mixture being then passed through a metering zone around the rotating shaft, extruded through a die and expanded to a foamed shape.

The invention also relates to an apparatus for the production of a thermoplastic resin foam, characterized in that an extruder for heating a thermoplastic resin and a blowing agent to melt is combined with an extruding unit comprising a kneading zone and a metering zone of a screw structure, said kneading zone comprising a barrel, a rotating shaft in it, and a plurality of perforated plates mounted on the shaft.

DETAILED DESCRIPTION OF THE INVENTION

Thermoplastic resins are used in the invention. For example, polyolefine resins such as polyethylene resins and polypropylene resins, styrenic resins, polyester resins such as polyethylene terephthalate, and polyvinyl chloride resins may be extruded and expanded to desired shapes. Among these, polystyrenic resins, polyolefin resins and polyester resins are particularly preferred for mixing with blowing agents and subsequent extrusion and expansion to produce foams.

In the invention, blowing agents are added to and mixed with thermoplastic resins. Examples of blowing agents include a decomposable blowing agent, volatile compounds such as hydrocarbons and fluorinated hydrocarbons, and inert gases such as carbon dioxide and nitrogen gases.

The invention also permits the mixing of thermoplastic resins with various additives that provide them with specified characteristics and exemplary additives include nucleating agents, foam-controlling agents, flame retardants, fillers, colorants and heat stabilizers.

The process according to the invention and the apparatus for implementing that process will now be described with reference to the accompanying drawings.

Figure 1:
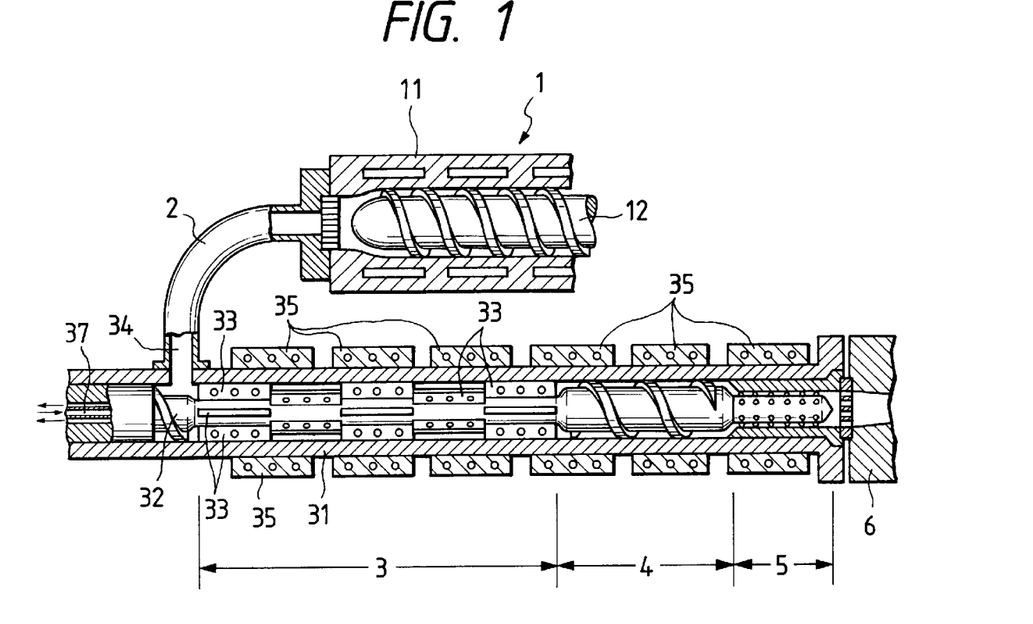
FIG. 1 is a section showing, in partial view, an example of the apparatus according to the invention.

In FIG. 1, numeral 1 designates an extruder, 2 a connecting pipe, 3 a kneading zone, 4 a metering zone, 5 an auxiliary mixing zone, and 6 is a die. Extruder 1 consists of a barrel 11 and a screw 12 provided rotatably in the barrel. Connecting pipe 2 is so adapted that a resin extruded from extruder 1 is directed to the entrance 34 of kneading zone 3. Kneading zone 3 consists of a barrel 31 and a rotating shaft 32, with a passageway for the resin being formed between the inner surface of the barrel 31 and the outer surface of the rotating shaft 32. The rotating shaft 32 is provided with a plurality of plates 33 each having three holes. Stated more specifically, a set of perforated plates 33 are spaced apart at equal distances in the circumferential direction and a plurality of such sets are arranged side by side on the shaft 32 in its axial direction to make the kneading zone. Two adjacent sets of plates are so positioned that they virtually contact end to end in the longitudinal direction; however, in the circumferential direction, the plates are staggered in such a way each of the plates in one set virtually lies between two plates in the adjacent set. Each plate 33 has three through-holes and it is provided on the shaft 32 in such a way that its thickness is substantially parallel to the direction in which the shaft 32 rotates. The thus constructed kneading zone 3 occupies 30 to 90% of the length of the shaft 32, which begins from the area right beneath the entrance 34 to the front end of the metering zone 4. Cooling jackets 35 are provided on the circumference of the barrel 31 and channels for the passage of a cooling medium extend through each cooling jacket. One end of the rotating shaft 32 extends behind the barrel 31 into a drive mechanism.

The shaft 32 in the metering zone 4 is of a screw structure that is in a cylindrical form of a uniform outside diameter and which has a uniform channel depth and flight pitch. Cooling jackets 35 are also provided on the circumference of the barrel 31 in the metering zone 4. The auxiliary mixing zone 5 is provided at the front end of the metering zone 4 and the rotating shaft in this zone has a smaller outside diameter and is provided with a multiple number of projections on the surface. The auxiliary mixing zone may be designed to have other structures such as a Dulmage structure and a static mixer.

The process of the invention is described below more specifically with reference to FIG. 1. A thermoplastic resin to which a blowing agent and other necessary additives have been added is melted in the extruder 1 and extruded into the connecting pipe 2, from which it passes through the entrance 34 to enter the kneading zone 3, through which it is allowed to travel by the extrusion force created by the extruder 1.

In the kneading zone 3 having the rotating shaft 32 in the barrel 31, the resin travels between the inner surface of the barrel 31 and the outer surface of the rotating shaft 32. Since the rotating shaft 32 has a multiple of perforated plates 33 that project radially outward and which extend along the axis, the resin is mixed under agitation as it travels through the kneading zone 3. At the same time, the resin is cooled with a cooling medium that is supplied into and discharged from the coolant channels through the cooling jackets 35. If desired, the resin may be cooled with a cooling means provided in the rotating shaft 32 in the kneading zone. The cooling means may have a dual-wall structure 37 consisting of an inner tube and an outer tube as shown in FIG. 1. A cooling medium for the cooling means may be supplied into the inner tube and discharged from the outer tube. Because of these arrangements, the resin is cooled by means of the barrel 31 and the rotating shaft 32 as it travels through the interior of the kneading zone 3. At the same time, the resin is thoroughly agitated by means of the perforated plates 33 to provide a uniformly mixed composition; the resulting uniformly mixed and cooled resin composition is transferred from the kneading zone 3 to the similarly cooled metering zone 4, where it travels in a consistent manner. The resin emerging from the metering zone 4 has been controlled to a temperature appropriate for expansion and is subsequently fed into the auxiliary mixing zone 5, where it is rendered to be more uniform.

The resin leaving the auxiliary mixing zone 5 is then directed to the die 6. The resin in the die 6 has a uniform temperature suitable for expansion; therefore, even if the passage in the die 6 is large enough to enable the extrusion of a shaped part having a large cross-sectional area, the extruded resin will expand uniformly throughout and there will be no differences between the surface area and the interior in such aspects as the expansion ratio, the size of cells and their distribution within the foam. In other words, there can be produced thick foams having consistent physical properties.

Figure 2:
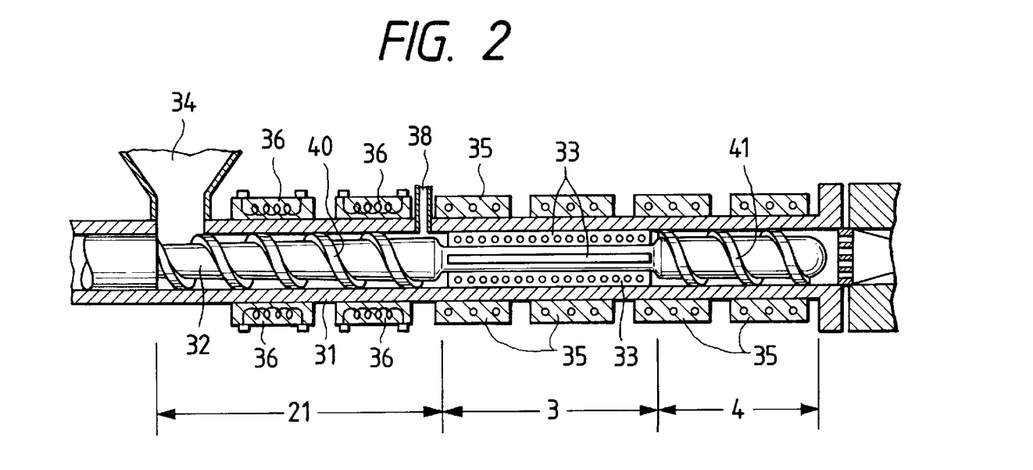
FIG. 2 is a section showing, with part taken away, another example of the invention.

FIG. 2 shows another example of the apparatus of the invention, in which the rotating shaft 32 is provided rotatably within the barrel 31. The barrel 31 has heating bands 36 and cooling jackets 35 provided on the surface so as to effect heating or cooling as required. The barrel 31 is also fitted with an entrance 34 for resin supply. The front end portion of the shaft 32 is shaped as a cylinder having a uniform outside diameter and has a screw structure having provided thereon a flight 41. The screw structure is formed on the surface with a uniform channel depth and flight pitch to create a metering zone 4. A feed zone 21 is also formed that starts just beneath the entrance 34 and which ends part of the length of the rotating shaft 32. At the end portion of the feeding zone 21, a gas injection hole 38 is provided for injecting a blowing agent. In the present invention, a blowing agent may be added to the thermoplastic resin at any time before kneading zone. A flight 40 is provided around the rotating shaft 32 in the feed zone 21. The channel depth of the feed zone 21 is maximal just beneath the entrance 34 and decreases progressively toward the front end. The metering zone 4 accounts for 10 to 30% of the overall length of the shaft 32 and the feed zone 21 accounts for 30 to 50% of the same overall length.

The extruding machine shown in FIG. 2 differs structurally from the conventional type in terms of the kneading zone 3 formed behind the metering zone 4. Stated more specifically, the kneading zone 3 shown in FIG. 2 has no screw structure but is provided with plates 33 having a multiple of holes.

In the kneading zone 3 shown in FIG. 2, the shaft 32 also assumes a cylindrical form as in the metering zone 4 but its outside diameter of the cylinder is made smaller than that of the cylinder which connects the bottoms of screw channels in the metering zone 4. The outside diameter of the shaft in the kneading zone 3 is preferably uniform but permits some variations. The shaft in the thus formed kneading zone 3 has four perforated plates 33 provided on the surface. The plates 33 extend from end to end of the kneading zone 3 and each has a multiple number of holes that penetrate its thickness. The plates 33 extend along the length of the shaft 32, with the thickness of each plate being substantially parallel to the direction in which the shaft 32 rotates. The plates 33 are fixed to the surface of the shaft 32, being offset by 90 degrees in the direction of width to be spaced equidistantly over the shaft 32 in its circumferential direction. The kneading zone 3 accounts for 30 to 60% of the overall length of the shaft 32; the length of the kneading zone 3 is preferably 15 to 30 times the major diameter d (as shown in FIGS. 5 to 8) of the kneading member including the rotating shaft and the perforated plates. In the present invention, the major diameter of the kneading member means a distance of two times the distance from the center of the rotating shaft to the edge of the plate apart from the center. The length of the metering zone is preferably 5 to 10 times the major diameter of the external thread.

In addition, the feed zone, the kneading zone and the metering zone preferably account for 30 to 50%, 30 to 60% and 10 to 30%, respectively, of the overall length of the shaft; these dimensions insure that the extruding machine shown in FIG. 2 suffices to achieve thorough kneading of the resin to produce a uniform melt, which can therefore be extruded to a shape in a simple, easy and consistent manner.

Another feature of the example shown in FIG. 2 is that the outside diameter of the shaft 32 in the kneading zone 3 is adjusted to be smaller than that of the shaft in the metering zone; this helps increase the capacity of the channels for the passage of the resin and, hence, the residence time of the molten resin which has been added to and mixed with the blowing agent is sufficiently prolonged to accomplish thorough mixing of the resin under agitation by means of the rotation of the perforated plates secured to the surface of the shaft 32.

In the present invention, as shown in FIGS. 1 and 2, (i) the extruder for heating a thermoplastic resin and (ii) the extruding unit comprising a kneading member and a metering member may be rotated independently of each other or in synchronization with each other.

Still another example of the kneading zone 3 is described below with reference to FIG. 3 and FIG. 4 which is a section taken on line IV—IV of FIG. 3. As shown, the shaft 32 in the kneading zone 3 is also shaped in a cylindrical form; the outside diameter of the cylinder is desirably uniform but permits some variations. Plates 331 to 334 are identical in shape and size and each has three holes that penetrate its thickness; the plates are fixed onto the shaft 32 along its length in such a way that the thickness of each plate is substantially parallel to the direction x in which the shaft 32 rotates whereas the length is parallel to the axial direction of the shaft.

The plates 331 to 334 are spaced equidistantly on the shaft 32 in both its axial and circumferential directions. Stated more specifically, a plurality of plates 331 are spaced equidistantly in a straight line on the shaft 32 and so are the plates 332, 333 and 334. As shown in FIG. 4, the line of plates 331 is spaced from the line of plates 332 in the circumferential direction by a central angle of 60 degrees and the same relationship is satisfied by the lines of plates 332 and 333 and the lines of plates 333 and 334. Thus, taken as a whole, the plates 331 to 334 are fixed to the shaft 32 as they are spaced equidistantly in both its axial and circumferential directions. In addition, the axial arrangement of these plates is staggered such that a plate 332 is located between adjacent plates 331 and this allows the plates 331 to 334 to be distributed even more uniformly on the entire surface of the shaft.

Figure 4:
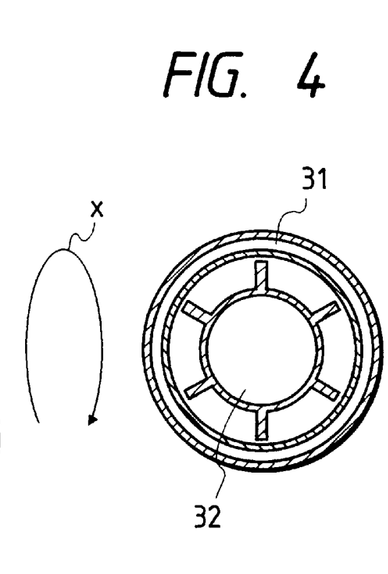
FIG. 4 is a section of the kneading zone taken on line IV—IV of FIG. 3.

As is clear from FIG. 4, the projecting end of each of the plates 331 to 334 is in close proximity to the inner surface of the barrel 31 and this insures that as the shaft 32 rotates within the barrel 31 in the direction of arrow x, the resin moving through the space between the inner surface of the barrel 31 and the outer surface of the shaft 32 is thoroughly mixed by means of the plates 331 to 334.

Each of the plates 331 to 334 has a plurality of holes 335. The openings provided by holes 335 in each plate preferably occupy 10 to 70% of the surface area of the plate. Adjacent plates in the same line are preferably spaced apart by a distance y which is 0.5 to 2 times the diameter of the hole 335. The plates are preferably arranged in 2 to 8 lines in the circumferential direction. If desired, each line may consist of one continuous plate rather than a plurality of spaced plates.

Figure 3:
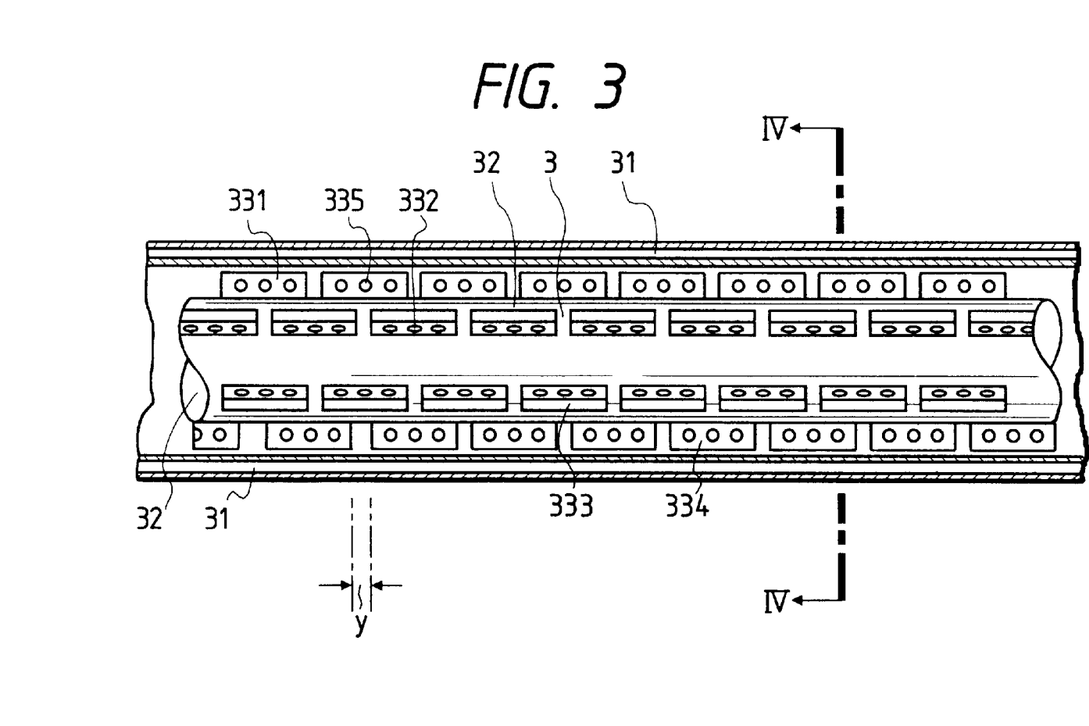
FIG. 3 is a section showing, with part taken away, yet another example of the kneading zone in the apparatus of the invention.
Figure 5:
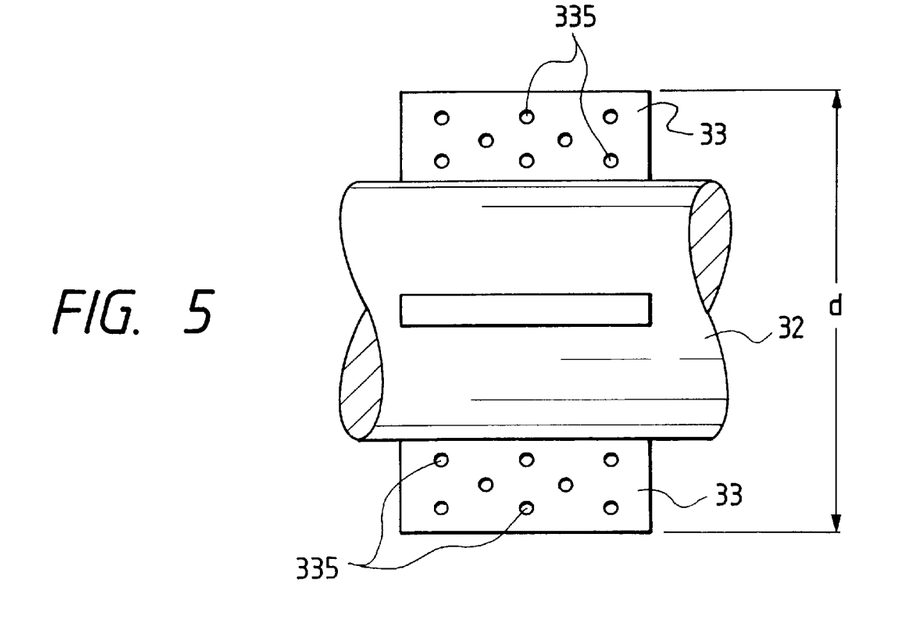
FIG. 5 is a fragmentary view of the rotating shaft in still another example of the kneading zone for use in the invention.

In the example shown in FIG. 3, three holes 335 are provided in one plate but this is not the sole case of the invention and each plate may have only one hole. Alternatively, a great number of holes are provided in a continuous plate. If desired, the density of hole 335 may be changed as shown in FIG. 5 such that more holes are provided in the base portion of a plate 33 which is close to the shaft 32 and in the projecting end portion which is close to the barrel 31 than in the middle portion. In another modification, the direction of the respective holes may be changed with respect to the travel of the resin such that the holes in the projecting end portion of the plate 33 are inclined toward the shaft 32 whereas the holes in the base portion are inclined toward the barrel 31.

In the case shown in FIGS. 3 and 4, the plates are provided perpendicular to the circumferential surface of the shaft 32 in such a way that the width of each plate is substantially parallel to the radial direction of the shaft. This is not the sole case of the invention and the plates may be provided such that the width of each plate is parallel to the tangential direction of the shaft and this can be accomplished by bolting the plates to the circumferential surface of the shaft.

Figure 6:
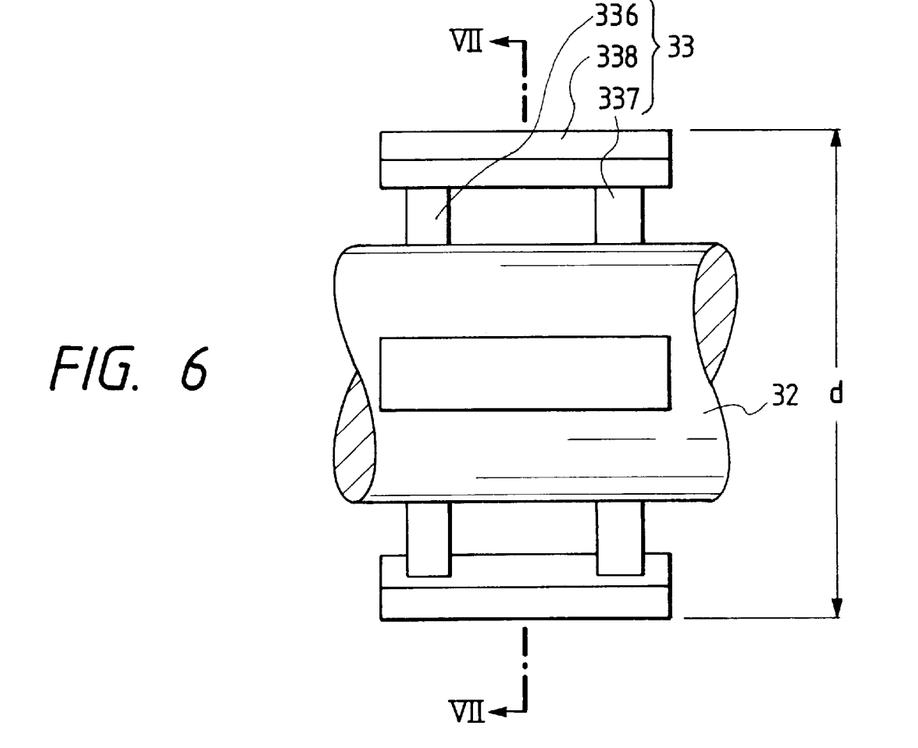
FIG. 6 is a fragmentary view of the rotating shaft in a further example of the invention.
Figure 7:
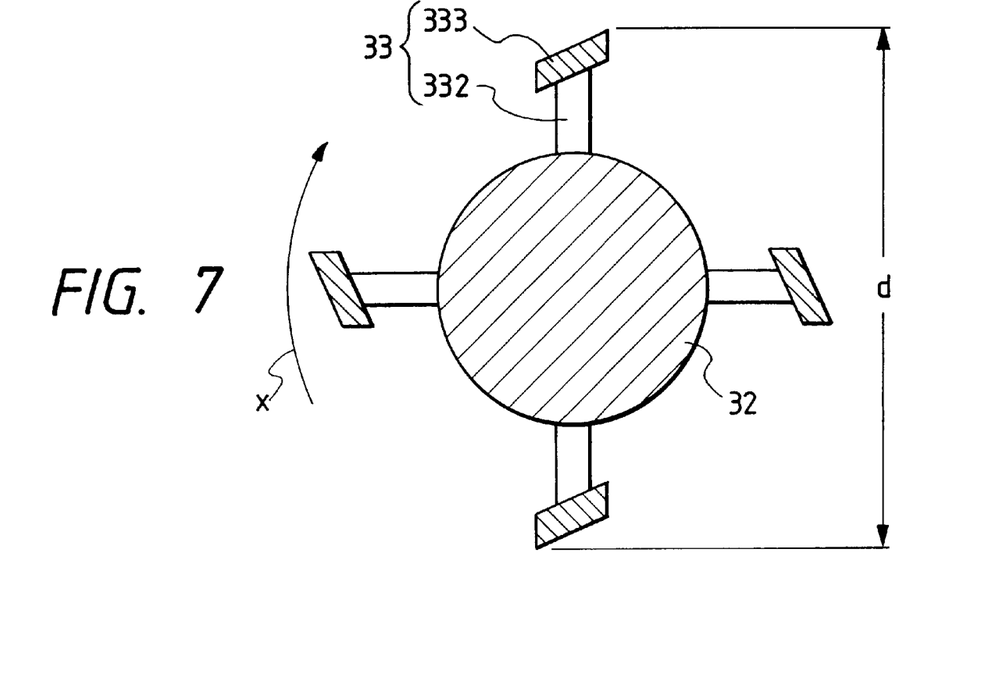
FIG. 7 is a section of the rotating shaft taken on line VII—VII of FIG. 6.

The plates to be used in the invention are by no means limited to a flat form and may have a generally U-shaped cross section as indicated by 33 in FIG. 6 which is a side view and in FIG. 7 which is a section taken on line VII—VII of FIG. 6. The plate 33 consists of two legs 336 and 337 which are fixed onto the shaft 32 and which are connected at the projecting ends by means of a bar 338. As is clear from FIG. 7, the bar 338 is inclined with respect to legs 336 and 337 and opposite ends of the tie-bar in the direction of its width project beyond the legs 336 and 337 when seen in the circumferential direction of the shaft 32. The structure of the plate 33 is such that the open space surrounded by the legs 336 and 337 and the bar 338 serves as a hole. The shaft 32 furnished with at least one plate 33 is preferably rotated in the direction indicated by arrow x in FIG. 7.

Figure 8:
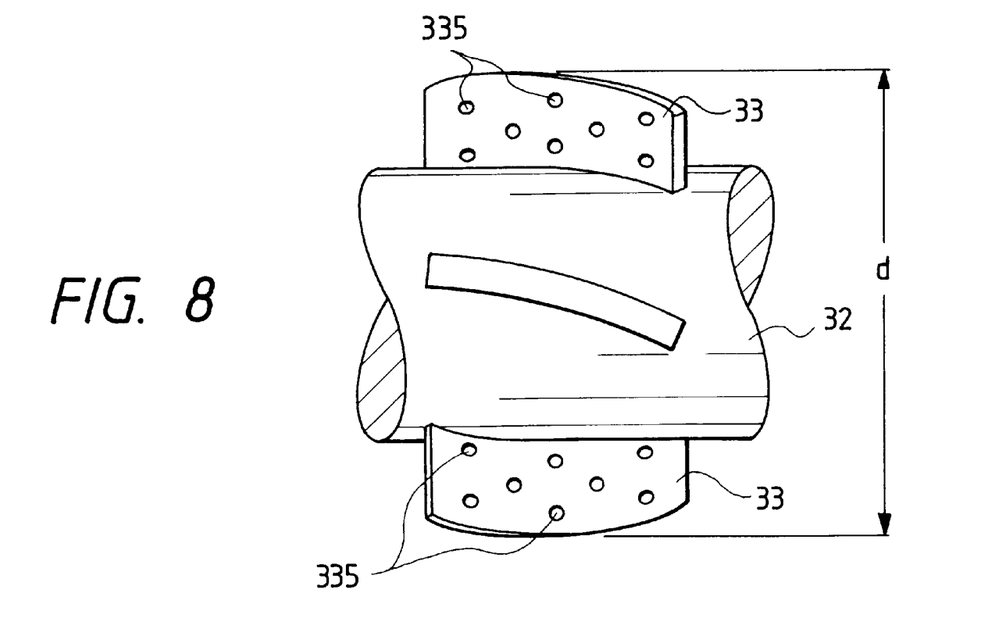
FIG. 8 is a fragmentary view of the rotating shaft in another example of the invention.

The plate 33 shown in FIG. 5 may be positioned at an angle with respect to the axial direction of the shaft 32 as shown in FIG. 8 and this arrangement is effective in reducing the load on the extruding machine, particularly its feed zone. The angle the plate 33 forms with the axial direction of the shaft 32 is preferably 10 degrees and less. This angle should be large enough to insure that the molten resin is given the necessary moving force in the kneading zone but should preferably not exceed 10 degrees in order to prevent heat generation and ensure against extrusion surging.

The barrel 31 in the extruder according to the present invention is commonly adapted to be capable of being heated or cooled as required. To this end, heating bands 36 or cooling jackets 35 may be provided on the surface of the barrel 31 as shown in FIG. 2. Alternatively, the barrel 31 may be designed to have a dual-wall structure consisting of an inner tube and an outer tube as shown in FIG. 3, with a heating or cooling medium being supplied into the space between the two tubes so as to heat or cool the barrel. Although not shown, the shaft 32 may be formed as a hollow member, into which a heating or cooling medium is supplied to heat or cool the shaft as required.

The method and apparatus of the invention will now be described more specifically by reference to an example, which is given here for illustrative purposes only and is by no means intended to be limiting.

EXAMPLE 1

A hundred parts by weight of polystyrene (ESBRITE 7M of Sumitomo Chemical Co., Ltd.) as a thermoplastic resin was mixed with 0.5 parts by weight of a fine talc powder as a foam-controlling agent and 2.0 parts by weight of a flame retardant (SR 103 of Dai-ichi Kogyo Seiyaku Co., Ltd.). The resulting composition was thoroughly mixed and fed into an extruder having an inside barrel diameter of 150 mm and a length of 5,100 mm and the polystyrene was melted with the barrel adjusted to a temperature of 180° C. The barrel had an inlet provided part of its length, through which a blowing agent was forced into the molten polystyrene. The blowing agent consisted of a mixture of 30 parts by weight of monochlorodifluoroethane and 70 parts by weight of methyl chloride. The mixture was forced into the molten polystyrene composition in an amount of about 12 parts by weight per 100 parts by weight of the latter.

The thus prepared resin composition was fed into an extruder (inside barrel diameter: 200 mm), in which it was subjected to mixing and cooling actions; thereafter, the cooled mass was extruded through a die and allowed to expand. The kneading zone of the extruder was of the type shown in FIG. 3; the rotating shaft 32 had a diameter of 140 mm; each of the plates 331 to 334 was 30 mm high and 150 mm long; the kneading zone had an axial length of 4,400 mm; the shaft 32 was rotated at a speed of 14 rpm; and the barrel 31 was cooled to a temperature of about 70° C. The metering zone had triple flights on the screw with a channel depth of 15 mm; the flight pitch was 110 mm; the axial length of the metering zone was 2,000 mm; and the barrel 31 was cooled to a temperature of 70° C. A zigzag mixer was installed ahead of the metering zone and it consisted of four mixing units of a Model SMX (Sulzer AG, Switzerland) connected in tandem, each being 152.4 mm in both outside diameter and length. With the extruder of this design, the resin composition was extruded through the die for expansion at a rate of 800 kg/h. A pressure of 70 kg/cm$^2$ developed between the metering zone and the zigzag mixer and the temperature at the entrance of the die was 106° C.

The die had a rectangular nozzle 500 mm wide and 4.0 mm thick at the exit end. The extruded resin expanded and was trimmed to produce a foamed board having a density of 29 to 30 kg/m$^3$, a width of 1,000 mm and a thickness of 120 mm. The foam had a substantially uniform cellular structure in both close to the skin and the interior, with the cells being distributed uniformly ranging in size from about 0.6 to about 0.8 mm.

Comparative Example

A resin composition was supplied into an extruder having an inside screw diameter of 150 mm and a length of 5,100 mm. With the barrel heated at 180° C., a blowing agent was injected into the resin feed through an inlet provided on the barrel part of its length. Subsequently, the resin composition was supplied into a second extruder having an inside screw diameter of 200 mm and a length of 6,400 mm; it had triple flights on the screw with a channel depth of 15 mm; the flight pitch was 110 mm. The temperature in the barrel was reduced progressively from 120° C. in the feed zone to 70° C. at the exit end and the resin feed was subjected to mixing and cooling actions with the screw rotating at a speed of 10 rpm.

The thus prepared resin composition was subsequently fed into a third extruder having a kneading zone that consisted of a barrel with an inside screw diameter of 300 mm and a rotating shaft with a diameter of 200 mm and a length of 3,600 mm which was equipped with a multiple of plates of the design shown in FIG. 6 and no metering zone was provided. The barrel was cooled to a temperature of 70° C. as the shaft was rotated at a speed of 3 rpm. Extrusion foaming was effected with the resin composition, a zigzag mixer and the die being designed in substantially the same manner as in Example 1, except that an extrusion pressure of 80 kg/cm$^2$ developed between the kneading zone and the zigzag mixer, that the temperature at the entrance of the die was 107° C.

The rate of extrusion foaming through the die was 820 kg/h and the foam had substantially the same physical properties as the product of Example 1.

Thus, the throughput of extrusion in the comparative example was a little bit higher than in Example 1 but this could only be achieved by using three units of extruding machine.

While the invention has been described in detail and with reference to specific embodiments thereof, it will be apparent to one skilled in the art that various changes and modifications can be made therein without departing from the spirit and scope thereof.

What is claimed is:

1. A process for producing a uniform thermoplastic resin foamed product comprising the steps of:
   (a) processing a thermoplastic resin admixed with a blowing agent in a feeding zone in which the thermoplastic resin is heated to render it molten and is uniformly admixed with a blowing agent, (b) passing the thus treated molten resin to a further processing zone comprising a central rotating shaft surrounded by a barrel and including:
  (1) a kneading and cooling section in which the rotating shaft has a smooth peripheral surface;
  (2) a metering section in which the rotating shaft has a peripheral continuous screw, the metering section being positioned downstream of the kneading and cooling section; and
  (3) a die having a port for discharging the foamed resin product, the die being positioned downstream of the metering section, the kneading and cooling section being provided with at least one set of perforated plates fixedly mounted on the circumference of the smooth peripheral surface of the rotating shaft, said rotating shaft and perforated plates constituting a kneading member, said at least one set of perforated plates extending parallel to the axial direction of the rotating shaft or at an angle of less than 10° relative to the axial direction of the rotating shaft, both the kneading and cooling section and the metering section being provided with a cooling jacket, wherein the length of the kneading section is 15 to 30 times the major diameter of the kneading member, and wherein the length of the metering section is 5 to 15 times the major diameter of the external thread of the peripheral continuous screw on the rotating shaft, the major diameter of the kneading member being a distance of two times the radial distance from the center of the rotating shaft to the edge of a plate;

(c) kneading and simultaneously cooling the molten resin in said further processing zone to a temperature appropriate for expansion by moving and forcing the molten resin through the perforations of the at least one set of perforated plates to thoroughly agitate the resin and to provide a uniformly mixed and cooled resin, and (d) metering, cooling and conveying a predetermined amount of said uniformly mixed and cooled resin at a uniform temperature suitable for expansion to the die port, and (e) discharging the resulting uniformly extruded expanded foamed resin product through the die port.

2. The process of claim 1, wherein the expanded foamed resin product is of such uniformity that there are no measurable differences between the surface and the interior of the resin in such aspects as the expansion ratio, cell size and cell distribution within the foam.

3. The process of claim 1, wherein the shaft rotates at a speed of 10 to 30 rpm.

4. The process of claim 1, wherein the peripheral continuous screw on the rotating shaft in the metering section has a constant channel depth and flight pitch.

5. The process of claim 1, wherein the metering section accounts for 10 to 30% of the overall length of the shaft, and the feeding zone accounts for 30 to 50% of the overall length of the shaft.

6. The process of claim 1, wherein the plates are spaced equidistantly over the shaft in its circumferential direction and are offset by 90 degrees in the width direction.

7. The process of claim 1, wherein a plurality of plates is spaced equidistantly in a straight line on the shaft in the axial direction of the shaft to form a line of plates, and a plurality of said lines of plates is spaced equidistantly in the circumferential direction on the shaft, said plates from one line of plates being angled by 60 degrees from the plates in the adjacent lines of plates.

8. A process for producing a uniform thermoplastic resin foamed product comprising the steps of:

(a) processing a thermoplastic resin admixed with a blowing agent in a first extrusion zone in which the thermoplastic resin is heated to render it molten and is uniformly admixed with a blowing agent, (b) passing the thus treated molten resin to a second extrusion zone comprising a central rotating shaft surrounded by a barrel and including:
  (1) a kneading and cooling section in which the rotating shaft has a smooth peripheral surface;
  (2) a metering section in which the rotating shaft has a peripheral continuous screw, the metering section being positioned downstream of the kneading and cooling section; and
  (3) a die having a port for discharging the foamed resin product, the die being positioned downstream of the metering section, the kneading and cooling section being provided with at least one set of perforated plates fixedly mounted on the circumference of the smooth peripheral surface of the rotating shaft, said rotating shaft and perforated plates constituting a kneading member, said at least one set of perforated plates extending parallel to the axial direction of the rotating shaft or at an angle of less than 10° relative to the axial direction of the rotating shaft, both the kneading and cooling section and the metering section being provided with a cooling jacket, wherein the length of the kneading section is 15 to 30 times the major diameter of the kneading member, and wherein the length of the metering section is 5 to 15 times the major diameter of the external thread of the peripheral continuous screw on the rotating shaft, the major diameter of the kneading member being a distance of two times the radial distance from the center of the rotating shaft to the edge of a plate;

(c) kneading and simultaneously cooling the molten resin in said second extrusion zone to a temperature appropriate for expansion by moving and forcing the molten resin through the perforations of the at least one set of perforated plates to thoroughly agitate the resin and to provide a uniformly mixed and cooled resin, (d) metering, cooling and conveying a predetermined amount of said uniformly mixed and cooled resin at a uniform temperature suitable for expansion to the die port, and (e) discharging the resulting uniformly extruded expanded foamed resin product through the die port.

9. The process of claim 8, wherein the expanded foamed resin product is of such uniformity that there are no measurable differences between the surface and the interior of the resin in such aspects as the expansion ratio, cell size and cell distribution within the foam.

10. The process of claim 8, wherein the shaft rotates at a speed of 10 to 30 rpm.

11. The process of claim 8, wherein the peripheral continuous screw on the rotating shaft in the metering section has a constant channel depth and flight pitch.

12. The process of claim 8, wherein the metering section accounts for 10 to 30% of the overall length of the shaft, and the first extrusion zone accounts for 30 to 50% of the overall length of the shaft.

13. The process of claim 8, wherein the plates are spaced equidistantly over the shaft in its circumferential direction and are offset by 90 degrees in the width direction.

14. The process of claim 8, wherein a plurality of plates is spaced equidistantly in a straight line on the shaft in the axial direction of the shaft to form a line of plates, and a plurality of said lines of plates is spaced equidistantly in the circumferential direction on the shaft, said plates from one line of plates being angled by 60 degrees from the plates in the adjacent lines of plates.

* * * * *